(12) United States Patent
Kurabayashi

(10) Patent No.: US 11,288,460 B2
(45) Date of Patent: Mar. 29, 2022

(54) TRANSLATION SUPPORT SYSTEM, ETC

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 249 days.

(21) Appl. No.: 16/586,000

(22) Filed: Sep. 27, 2019

(65) Prior Publication Data

US 2020/0026763 A1    Jan. 23, 2020

Related U.S. Application Data

(63) Continuation of application No. PCT/JP2018/011977, filed on Mar. 26, 2018.

(30) Foreign Application Priority Data

Mar. 29, 2017    (JP) .............................. JP2017-065365

(51) Int. Cl.
*G06F 40/58*    (2020.01)
*G06F 40/51*    (2020.01)

(52) U.S. Cl.
CPC .............. *G06F 40/58* (2020.01); *G06F 40/51* (2020.01)

(58) Field of Classification Search
CPC ........... G06F 40/58; G06F 40/51; G06F 40/42
USPC .......................................................... 704/2
See application file for complete search history.

(56) References Cited

FOREIGN PATENT DOCUMENTS

| JP | S64-35661 A | 2/1989 |
| JP | 2006-4366 A | 1/2006 |

OTHER PUBLICATIONS

International Search Report issued in Application No. PCT/JP2018/011977, dated Jun. 12, 2018 (3 pages).
Written Opinion issued in International Application No. PCT/JP2018/011977, dated Jun. 12, 2018 (3 pages).
Philipp Koehn et al.; "Statistical Phrase-Based Translation;" Information Sciences Institute Department of Computer Science University of Southern California; pp. 48-54; May-Jun. 2003; URL: http://dx.doi.org/10.3115/1073445.1073462 (7 pages).
(Continued)

*Primary Examiner* — Thierry L Pham
(74) *Attorney, Agent, or Firm* — Osha Bergman Watanabe & Burton LLP

(57) ABSTRACT

The present invention is a translation support system for supporting machine translation from a source-language sentence into a target-language sentence, the translation support system including an input unit that accepts an input of a source-language sentence to be translated; an error database that at least stores words or combinations of words included in a plurality of source-language sentences for which machine translation from the source-language sentences into target-language sentences is not performed correctly; a controlled-source-language-sentence database that stores a plurality of source-language sentences as well as controlled source-language sentences, which are source-language sentences that are controlled, corresponding to the plurality of source-language sentences and expressed in a format satisfying predetermined conditions; a control unit that classifies whether or not the input source-language sentence is machine-translatable; and an output unit that is capable of outputting the input source-language sentence classified as being non-machine-translatable.

12 Claims, 7 Drawing Sheets

(56) References Cited

OTHER PUBLICATIONS

Tobias Kuhn; "A Survey and Classification of Controlled Natural Languages;" Association for Computational Linguistics; Apr. 25, 2013; URL: http://dx.doi.org/10.1162/COLI_a_00168 (56 pages).
Norbert E. Fuchs et al.; "Attempto Controlled English for Knowledge Representation;" Department of Informatics & Institute of Computational Linguistics, University of Zurich, Switzerland; URL: http://dx.doi.org/10.1007/978-3-540-85658-0_3(21 pages).
William H. DuBay; "The Principles of Readability;" Impact Information, Costa Mesa California; 2004; URL: http://www.impactinformation.com/impactinfo/readability02.pdf (77 pages).

FIG.4

Input

| Oneiros met Coux. | 41 |

Input language  English ▼
Output language Japanese ▼

[Translate]

Output

| Bob met Andy. | 42 |

| AndyにBobは会った。 | 43 |

| CouxにOneirosは会った。 | 44 |

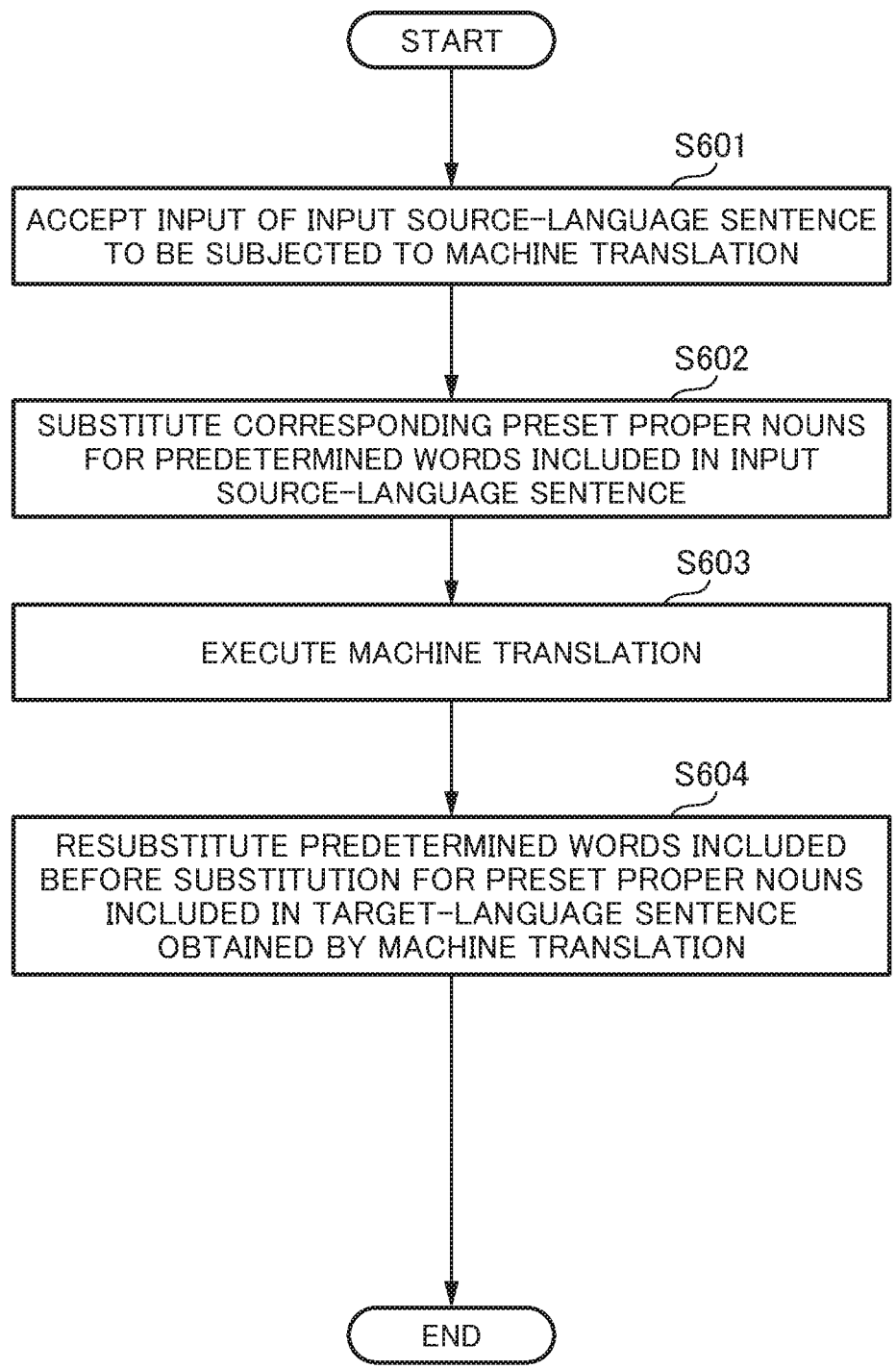

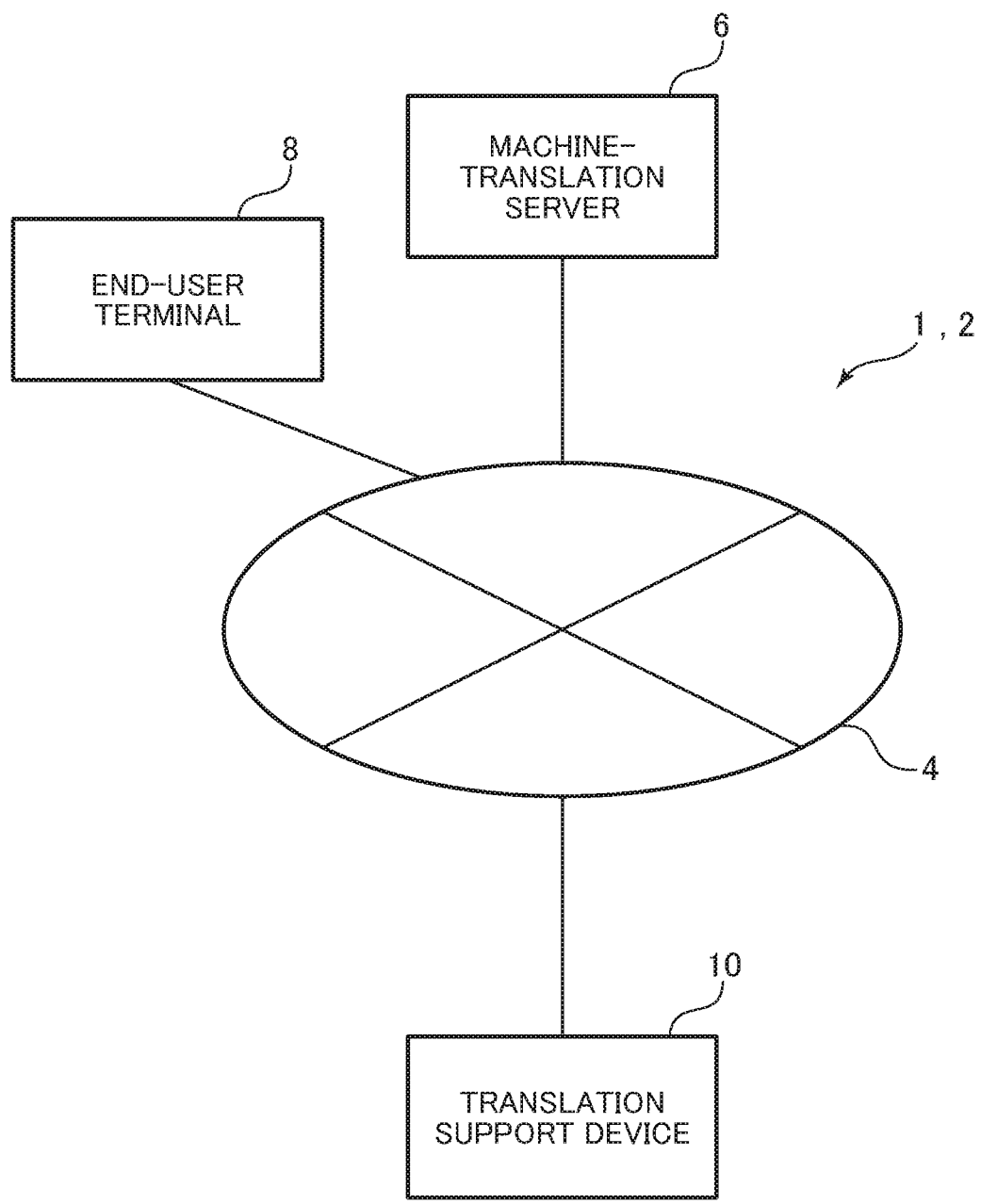

TRANSLATION SUPPORT SYSTEM, ETC

TECHNICAL FIELD

The present invention relates to translation support systems, particularly to a translation support system, a translation support device, a program, and a method for supporting machine translation from a source-language sentence into a target-language sentence.

BACKGROUND ART

Recently, with the advances in the Internet, machine translation systems (machine translation engines) have become available on the Internet for free or for a charge. There are two approaches for machine translation: rule base machine translation (RBMT) and statistical machine translation (SMT).

Rule base machine translation adopts a method in which the source language is subjected to syntactic analysis and is translated into the target language on a per-clause basis, and the character sequence resulting from the translation is rearranged in accordance with the grammar of the target language. In the syntactic analysis and clause translation, rule base machine translation uses manually prepared knowledge, such as language rules, grammar rules, and a dictionary. Rule based machine translation is realized, for example, by a human programming a translation dictionary and translation rules. At this time, the programmer, being familiar with the grammars of both the source language and the target language, considers rules for rearranging the word order to substituting corresponding phrases and writes the rules in a format executable as a program.

Statistical machine translation is an approach in which a translation model is automatically generated from a large volume of translation pairs (corpus) (Non-Patent Literature 1). Typical implementations include Google Translate API and Microsoft Translate API. With statistical machine translation, it is possible to automatically generate, from the corpus, language rules, grammar rules, and a dictionary, which have been required for rule base machine translation, and thus it is possible to construct a translation system at low cost. Furthermore, statistical machine translation allows feedback learning so that a suitable result will be selected from among a plurality of translation result candidates in accordance with feedback from users, which results in an advantage that it is possible to progressively improve the translation accuracy. With this feedback learning, when a user selects or enters a more suitable translation, by using this input as a feedback, it becomes possible to automatically select a suitable result from among a plurality of translation result candidates on the next occasion. With these features, statistical machine translation is extremely useful for translation involving a large number of languages (e.g., a few tens of languages or more).

There is a method of improving translation accuracy by controlling the input source language with these machine translation systems. In this description, as a system for performing translation with an abstraction level higher one level higher than that of machine translation systems, this will be referred to as a meta-level translation system. Existing techniques for this meta-level translation system include methods for performing multi-language rendering with extremely high accuracy through rewriting into text having low ambiguity by using a natural language having certain restrictions, called a controlled natural language (CNL) (Non-Patent Literatures 2 and 3). Multi-language translation via a CNL has already been introduced into practical use as a method of automatically translating accurate information, as in multi-language rendering of avalanche warnings.

CITATION LIST

Non Patent Literature

{NPL 1}
Philipp Koehn, Franz Josef Och, and Daniel Marcu. 2003. Statistical phrase-based translation. In Proceedings of the 2003 Conference of the North American Chapter of the Association for Computational Linguistics on Human Language Technology—Volume 1 (NAACL '03), Vol. 1. Association for Computational Linguistics, Stroudsburg, Pa., USA, 48-54. DOI=http://dx.doi.org/10.3115/1073445.1073462.

{NPL 2}
Tobias Kuhn. 2014. A survey and classification of controlled natural languages. Comput. Linguist. 40, 1 (March 2014), 121-170. DOI=http://dx.doi.org/10.1162/COLI_a_00168

{NPL 3}
Norbert E. Fuchs, Kaarel Kaljurand, and Tobias Kuhn. 2008. Attempto Controlled English for Knowledge Representation. In Reasoning Web, LNCS5224. Springer-Verlag, 104-124. DOI=http://dx.doi.org/10.1007/978-3-540-85658-0_3

SUMMARY OF INVENTION

Technical Problem

As described above, there are various approaches for machine translation; however, the following problems exist.

With rule base machine translation, the accuracy is stably high for translation of various kinds of text; however, labor is involved for manually constructing language rules, grammar rules, and a dictionary. Furthermore, it is necessary to create such language rules, grammar rules, and a dictionary for both the source language and the target language, and the costs of performing translation involving a large number of languages (e.g., a few tens of languages or more) tend to be even higher.

As for statistical machine translation, application to fields in which it is not possible to prepare a large corpus is difficult, and application to fields in which a large number of unknown words may occur is difficult. Furthermore, since the translation accuracy depends on the corpus, it is difficult to maintain the translation accuracy at a constant level. For example, when applying statistical machine translation to the field of games, it is necessary to prepare and learn in advance a large volume of translation pairs of text similar to the narrative to be translated. In the narrative text in a game (text of the scenario, etc. in a game), there is a lot of text including unusual expressions or ambiguous text whose meaning is determined depending on information lying behind the game, and thus it is difficult to subject the narrative text directly to statistical machine translation. As for feedback learning, though being suitable for web translation, for which a large number of users exist, it is not possible to perform learning for multiple languages at once, which prohibits direct application thereof for the purpose of highly accurate multi-language rendering of narrative text in a game.

With the method of rewriting a source-language sentence into a CNL sentence before executing machine translation, it is possible to obtain accurate translation results in multiple languages by rewriting all of the original sentences into CNL sentences (sentences satisfying certain restrictions of a CNL); however, this requires labor for manual rewriting into CNL sentences. Furthermore, a CNL is not suitable for expressing the intrinsically delicate nuances of a natural language, and there are cases where it is not necessarily appropriate to rewrite all the text into CNL sentences.

As described above, for the purpose of performing multi-language rendering, for example, of a large volume of narrative text in a game, with high speed and high accuracy by using an existing machine translation system, although elemental technologies exist, no technology for suitably integrating those elemental technologies has been established yet. Here, the high accuracy of translation refers to the translation accuracy including the preservation of the nuances of the original text.

The present invention has been made in order to solve the problem described above, and the chief object thereof is to provide a translation support system that makes it possible, by using a machine translation system, to reduce manual interventions, thereby reducing translation costs, while maintaining high translation accuracy.

Solution to Problem

In order to achieve the above object, a translation support system according to an aspect of the present invention is a translation support system for supporting machine translation from a source-language sentence into a target-language sentence, the translation support system characterized by including an input unit that accepts an input of a source-language sentence to be translated; an error database that at least stores words or combinations of words included in a plurality of source-language sentences for which machine translation from the source-language sentences into target-language sentences is not performed correctly; a controlled-source-language-sentence database that stores a plurality of source-language sentences as well as controlled source-language sentences, which are source-language sentences that are controlled, corresponding to the plurality of source-language sentences and expressed in a format satisfying predetermined conditions; a control unit that classifies whether or not the input source-language sentence is machine-translatable; and an output unit that is capable of outputting the input source-language sentence classified as being non-machine-translatable, and the translation support system being characterized in that the control unit determines a score representing the complexity of the input source-language sentence on the basis of the sentence structure of the input source-language sentence, classifies whether or not the input source-language sentence is machine-translatable according to the level of the score, and in the case where the input source-language sentence is classified as being machine-translatable, further classifies whether or not the input source-language sentence is machine-translatable on the basis of a word or a combination of words included in the input source-language sentence, as well as the words or combinations of words stored in the error database; and in the case where the input source-language sentence is classified as being non-machine-translatable, classifies whether or not the input source-language sentence is convertible into the controlled-source-language sentence by comparing the word or the combination of words included in the input source-language sentence and the words or the combination of words included in the source-language sentences stored in the controlled-source-language-sentence database, and in the case where the input source-language sentence is classified as being convertible, converts the input source-language sentence into the controlled-source-language sentence and classifies the input source-language sentence as being machine-translatable, and in the case where the input source-language sentence is classified as being non-convertible, classifies the input source-language sentence as being non-machine-translatable.

Preferably, in the present invention, the control unit determines the score representing the complexity of the input source-language sentence on the basis of at least one of the length of the source-language sentence, the number of predetermined parts of speech included in the source-language sentence, and the number of predetermined words included in the source-language sentence.

Furthermore, preferably, in the present invention, the translation support system further includes a source-language-sentence corpus that stores a plurality of source-language sentences, each of the stored source-language sentences being associated with a score representing the complexity of that source-language sentence, and the control unit determines the score representing the complexity of the input source-language sentence on the basis of the score associated with one of the stored source-language sentences, having high similarity with the input source-language sentence.

Furthermore, preferably, in the present invention, the controlled-source-language sentence is a source-language sentence expressed by using a grammar, a syntax, and a vocabulary that are suitable for machine translation.

Furthermore, preferably, in the present invention, the input unit is further capable of accepting an input of a controlled source-language sentence for the source-language sentence classified as being non-convertible into a controlled source-language sentence, and the control unit converts the source-language sentence classified as being non-convertible into a controlled source-language sentence into the controlled source-language sentence accepted as the input, and stores the source-language sentence classified as being non-convertible into a controlled source-language sentence and the controlled source-language sentence accepted as the input in the controlled-source-language-sentence database.

Furthermore, preferably, in the present invention, the control unit, by using a machine translation system, executes machine translation for the input source-language sentence classified as being machine-translatable and the converted controlled-source-language sentence and outputs target-language sentences obtained by the machine translation to the output unit.

Furthermore, preferably, in the present invention, the input unit is capable of further accepting that the target-language sentence obtained by the machine translation was not a suitable translation, and the control unit stores the input source-language sentence before the execution of the machine translation, corresponding to the target-language sentence, in the error database.

Furthermore, preferably, in the present invention, the control unit substitutes a preset proper noun for a predetermined word included in the input source-language sentence before the execution of the machine translation, and resubstitutes the word before the substitution for the substituted proper noun included in the target-language sentence obtained by the machine translation.

Furthermore, preferably, in the present invention, the control unit regularly executes machine translation for a preset source-language sentence by using the machine translation system and detects a change in the machine translation system on the basis of a comparison between a target-language sentence obtained by the machine translation and a target-language sentence obtained by machine translation immediately preceding the machine translation.

Furthermore, in order to achieve the above object, a translation support device according to an aspect of the present invention is a translation support device for supporting machine translation from a source-language sentence into a target-language sentence, the translation support device being characterized by including an input unit that accepts an input of a source-language sentence to be translated; an error database that at least stores words or combinations of words included in a plurality of source-language sentences for which machine translation from the source-language sentences into target-language sentences is not performed correctly; a controlled-source-language-sentence database that stores a plurality of source-language sentences as well as controlled source-language sentences, which are source-language sentences that are controlled, corresponding to the plurality of source-language sentences and expressed in a format satisfying predetermined conditions; a control unit that classifies whether or not the input source-language sentence is machine-translatable; and an output unit that is capable of outputting the input source-language sentence classified as being non-machine-translatable, and the translation support device being characterized in that the control unit determines a score representing the complexity of the input source-language sentence on the basis of the sentence structure of the input source-language sentence, classifies whether or not the input source-language sentence is machine-translatable according to the level of the score, and in the case where the input source-language sentence is classified as being machine-translatable, further classifies whether or not the input source-language sentence is machine-translatable on the basis of a word or a combination of words included in the input source-language sentence as well as the words or combinations of words stored in the error database; and in the case where the input source-language sentence is classified as being non-machine-translatable, classifies whether or not the input source-language sentence is convertible into the controlled-source-language sentence by comparing the word or the combination of words included in the input source-language sentence and the words or the combination of words included in the source-language sentences stored in the controlled-source-language-sentence database, and in the case where the input source-language sentence is classified as being convertible, converts the input source-language sentence into the controlled-source-language sentence and classifies the input source-language sentence as being machine-translatable, and in the case where the input source-language sentence is classified as being non-convertible, classifies the input source-language sentence as being non-machine-translatable.

Furthermore, in order to achieve the above object, a program according to an aspect of the present invention is a program for supporting machine translation from a source-language sentence into a target-language sentence, the program being characterized by causing a computer to execute an input accepting step of accepting an input of a source-language sentence to be translated; a first classifying step of determining a score representing the complexity of the input source-language sentence on the basis of the sentence structure of the input source-language sentence and classifying whether or not the input source-language sentence is machine-translatable according to the level of the score; a second classifying step of classifying, in the case where the input source-language sentence is classified as being machine-translatable in the first classifying step, whether or not the input source-language sentence is machine-translatable on the basis of a word or a combination of words included in the input source-language sentence as well as words or combinations of words stored in a database that at least includes words or combinations of words included in a plurality of source-language sentences for which machine translation from the source-language sentences into target-language sentences is not performed correctly; a third classifying step of classifying, in the case where the input source-language sentence is classified as being non-machine-translatable in the first classifying step or the second classifying step, whether or not the input source-language sentence is convertible into the controlled-source-language sentence by comparing the word or the combination of words included in the input source-language sentence with words or combinations of words included in source-language sentences stored in a database that stores a plurality of source-language sentences as well as controlled source-language sentences, which are source-language sentences that are controlled, corresponding to the plurality of source-language sentences and expressed in a format satisfying predetermined conditions, and in the case where the input source-language sentence is classified as being convertible, converting the input source-language sentence into the controlled-source-language sentence and classifying the input source-language sentence as being machine-translatable, and in the case where the input source-language sentence is classified as being non-convertible, classifying the input source-language sentence as being non-machine-translatable; and an output step of outputting the input source-language sentence classified as being non-machine-translatable in the third classifying step.

Furthermore, in order to achieve the above object, a method according to an aspect of the present invention is a method for supporting machine translation from a source-language sentence into a target-language sentence, the method being characterized by including an input accepting step of accepting an input of a source-language sentence to be translated; a first classifying step of determining a score representing the complexity of the input source-language sentence on the basis of the sentence structure of the input source-language sentence and classifying whether or not the input source-language sentence is machine-translatable according to the level of the score; a second classifying step of classifying, in the case where the input source-language sentence is classified as being machine-translatable in the first classifying step, whether or not the input source-language sentence is machine-translatable on the basis of a word or a combination of words included in the input source-language sentence as well as words or combinations of words stored in a database that at least includes words or combinations of words included in a plurality of source-language sentences for which machine translation from the source-language sentences into target-language sentences is not performed correctly; a third classifying step of classifying, in the case where the input source-language sentence is classified as being non-machine-translatable in the first classifying step or the second classifying step, whether or not the input source-language sentence is convertible into the controlled-source-language sentence by comparing the word or the combination of words included in the input source-language sentence with words or combinations of words included in source-language sentences stored in a database that stores a plurality of source-language sentences as well as controlled source-language sentences, which are source-language sentences that are controlled, corresponding to the plurality of source-language sentences and expressed in a format satisfying predetermined conditions, and in the case where the input source-language sentence is classified as being convertible, converting the input source-language sentence into the controlled-source-language sentence and classifying the input source-language sentence as being machine-translatable, and in the case where the input source-language sentence is classified as being non-convertible, classifying the input source-language sentence as being non-machine-translatable; and an output step of outputting the input source-language sentence classified as being non-machine-translatable in the third classifying step.

Advantageous Effects of Invention

The present invention makes it possible, by using a machine translation system, to reduce manual interventions, thereby reducing translation costs, while maintaining high translation accuracy.

BRIEF DESCRIPTION OF DRAWINGS

FIG. 4 shows the manner of filtering processing by a character-sequence-conversion filtering unit in a machine-translation conversion unit according to the embodiment of the present invention.

FIG. 6 is a flowchart showing machine-translation processing by the translation support device according to the embodiment of the present invention.

FIG. 7 is an overall configuration diagram of the translation support system according to another embodiment of the present invention.

DESCRIPTION OF EMBODIMENTS

Embodiments of the present invention will be described below with reference to the drawings. Translation support systems according to the embodiments of the present invention are systems that improve the translation accuracy of an existing machine translation system by controlling a source language that is input, i.e., meta-level translation systems having an abstraction level that is one level higher than the existing machine translation system. For example, the translation support systems according to the embodiments of the present invention are meta-level translation systems for performing multi-language rendering of a game in which a large volume of text is displayed, such as Japanese RPGs, with high accuracy and at low cost by using an existing machine translation system.

In this description, a source-language sentence is a sentence constructed in a language to be translated (pre-translation language), a target-language sentence is a sentence constructed in a translated language (post-translation language), and sentences should be construed to include incomplete sentences, such as a sentence consisting of only nouns. Furthermore, although it is assumed in the embodiments that the source language is English, the source language may be other languages. Furthermore, in this specification, in the case where one or more sentences are referred to and are mentioned as the individual sentences in the subsequent description, that description should also be construed to include the case of one sentence.

Figure 1:
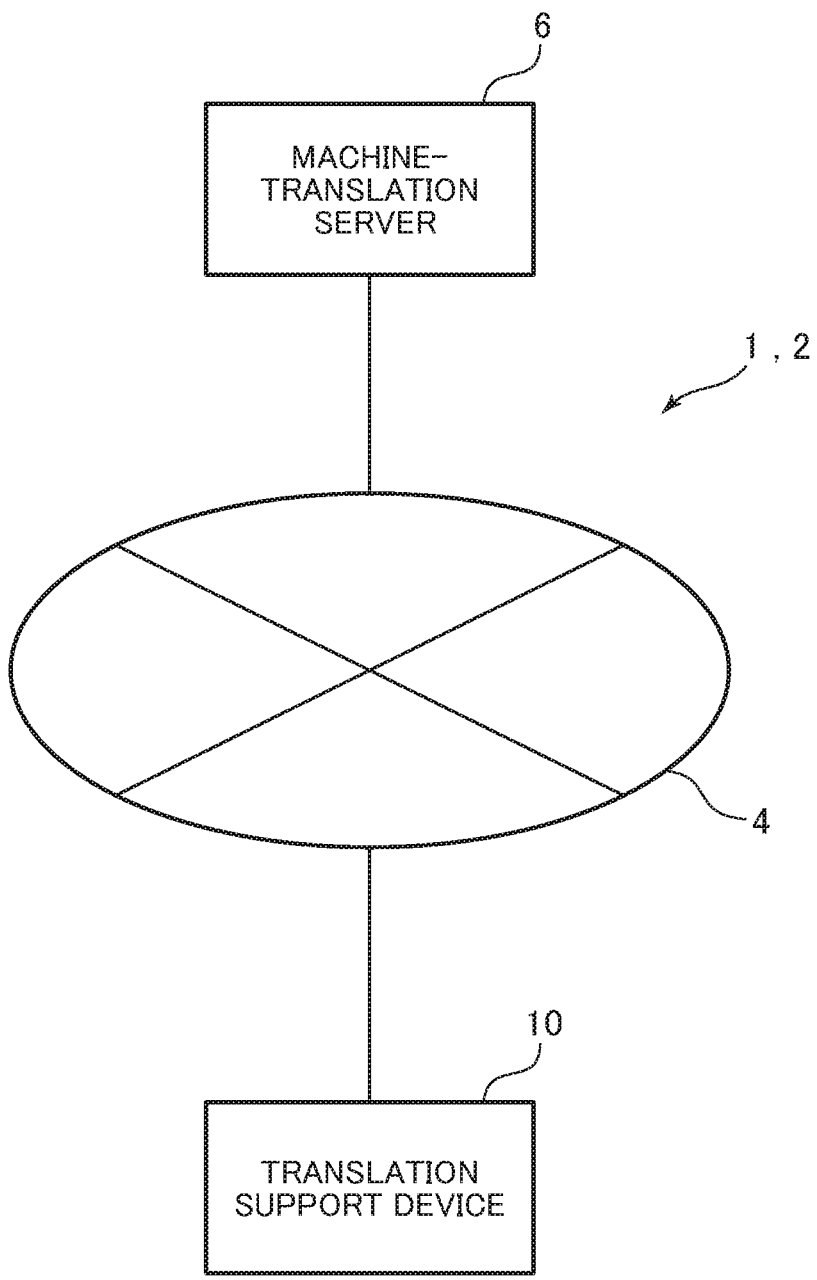
FIG. 1 is an overall configuration diagram of a system according to an embodiment of the present invention.

FIG. 1 is an overall configuration diagram of a translation system 2 according to an embodiment of the present invention. As shown in FIG. 1, the translation system 2 includes a translation support device 10 and a machine translation server 6. The translation support device 10 and the machine translation server 6 are connected to a network 4, such as the Internet, such that mutual communications are allowed therebetween. Alternatively, these components may be directly connected each other. A translation support system 1 includes components other than the machine translation server 6 of the translation system 2.

Figure 2:
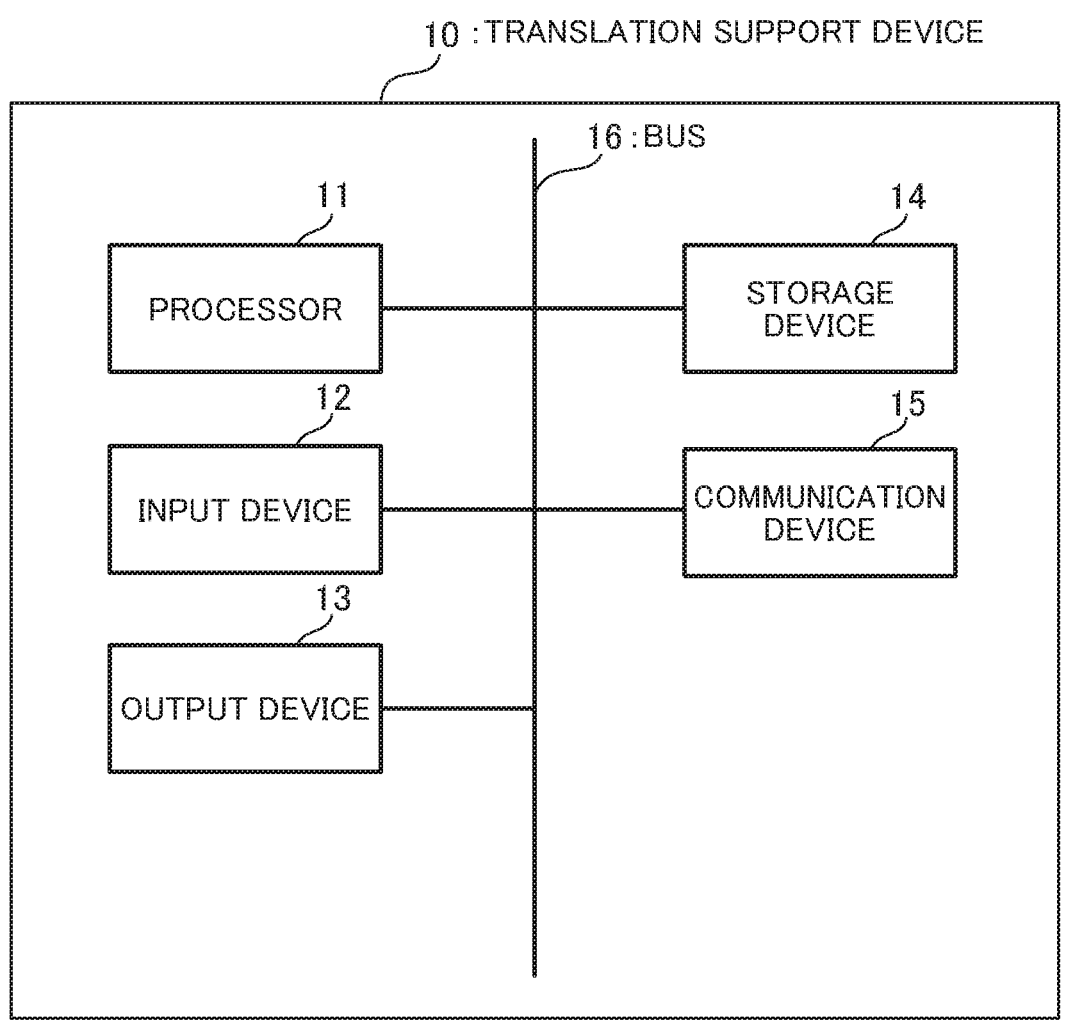
FIG. 2 is a block diagram showing the hardware configuration of a translation support device according to the embodiment of the present invention.

FIG. 2 is a block diagram showing the hardware configuration of the translation support device 10 according to the embodiment of the present invention. The translation support device 10 according to this embodiment includes components similar to those of an ordinary server, PC, or the like. The translation support device 10 includes a processor 11, an output device 12, an input device 13, a storage device 14, and a communication device 15. These constituent devices are connected via a bus 16. It is to be understood that interfaces are interposed between the bus 16 and the individual constituent devices as needed.

The processor 11 controls the overall operation of the translation support device 10; for example, the processor 11 is a CPU. Alternatively, an electronic circuit such as an MPU may be used as the processor 11. The processor 11 executes various kinds of processing by loading programs and data stored in the storage device 14 and executing the programs.

The input device 12 is a user interface that accepts inputs from a user to the translation support device 10; for example, the input device 12 is a touchscreen, a touchpad, a keyboard, or a mouse.

The output device 13 outputs or displays output information of the translation support system 1 to the user; for example, the output device 13 is a display that outputs an image. The output device 13 may also include a printer.

The storage device 14 includes a main storage device and an auxiliary storage device. The main storage device is a semiconductor memory, such as a RAM. A RAM is a volatile storage medium that allows high-speed reading and writing of information and is used as a storage area and a work area when the processor 11 processes information. The main storage device may include a ROM, which is a read-only, non-volatile storage medium. In this case, the ROM stores programs such as firmware. The auxiliary storage device stores various programs and data used by the processor 11 when the programs are executed. The auxiliary storage device is, for example, a hard disk device, but may be any kind of non-volatile storage or non-volatile memory that is capable of storing information, and may be of the removable type. For example, the auxiliary storage device stores an operating system (OS), middleware, application programs, various kinds of data that may be referred to in relation to the execution of the programs, etc.

The communication device 15 is a device for sending data to and receiving data from other computers via the network 4. For example, the communication device 15 connects to the network 4 by carrying out wired communications using an Ethernet (registered trademark) cable or the like or wireless communications such as mobile communications or wireless LAN communications.

In this embodiment, the translation support device 10 has a database server function. In this case, the storage device 14 stores data (e.g., tables) and programs for various databases, and the programs are executed, whereby the various databases are realized. In another example, the translation support device 10 is configured of a plurality of computers (servers). In this case, the translation support device 10 may be configured to include a database server.

The machine translation server 6 is a server that executes machine translation and provides machine translation in response to accesses from arbitrary client terminals, including the translation support device 10. The machine translation server 6 is an existing machine translation system, such as Google Translate API or Microsoft Translate API. The machine translation server 6 executes machine translation of a source-language sentence accepted from the translation support device 10 from a source language into a target language as designated by the translation support device 10 and returns a target-language sentence obtained by machine translation to the translation support device 10.

Figure 3:
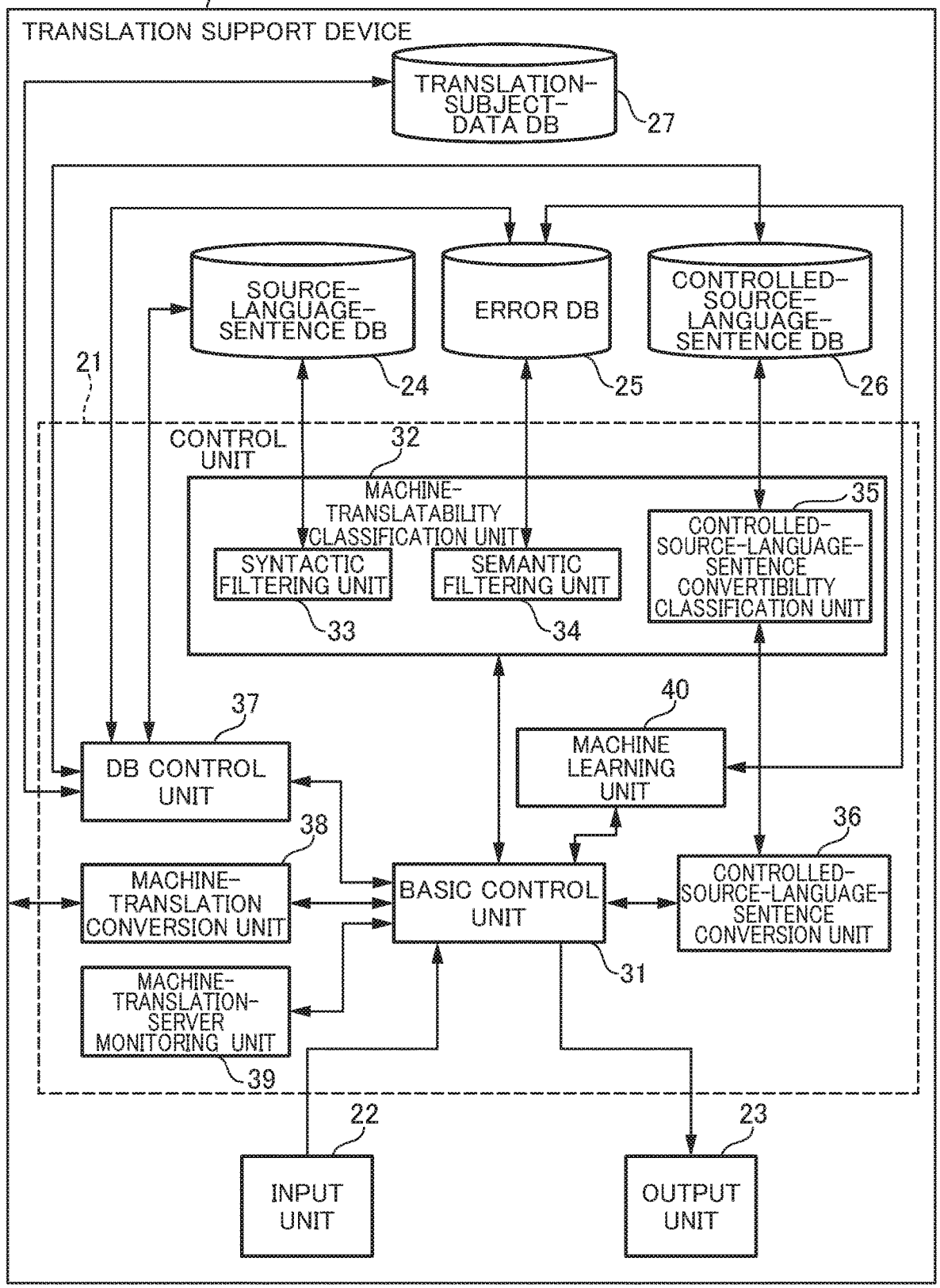
FIG. 3 shows an example of the functional block diagram of the translation support device according to the embodiment of the present invention.

FIG. 3 shows an example of the functional block diagram of the translation support device 10 according to the embodiment of the present invention. The translation support device 10 includes a control unit 21, an input unit 22, an output unit 23, a source-language-sentence database (DB) 24, an error DB 25, a controlled-source-language-sentence DB 26, and a translation-subject-data DB 27. In this embodiment, these functions are realized by the execution of programs by the processor 11. Alternatively, these functions may be realized by hardware by configuring electronic circuits or the like for realizing the individual functions. In this embodiment, since various functions are realized by loading programs, a portion of one part (function) may be included in another part. Furthermore, although main information transfers among the individual parts are indicated by arrows in the figure, information transfers are not limited to these as long as it is possible to realize the operation according to the embodiment of the present invention.

The input unit 22 is configured by using the input device 12 and is configured to accept inputs from the user to the translation support device 10. The output unit 23 outputs data and signals to the user via the output device 13.

In one example, the input unit 22 accepts the input of one or more source-language sentences to be translated. At this time, the input unit 22 accepts the input of designation of a source language and designation of a target language. Alternatively, the configuration may be such that the input unit 22 accepts the input of designation of a target language before information is sent to the machine translation server 6. In one example, the output unit 23 displays, on a display, a screen for accepting the input of a translation subject, the selection of a source language, and the selection of a target language. Here, the selection of a source language and the selection of a target language refer to selecting one of a plurality of languages for translation covered in advance by the translation support system 1. Preferably, the languages for translation covered by the translation support system 1 are the same as the languages supported by the existing machine translation system. Hereinafter, the one or more source-language sentences to be translated, input to and accepted by the input unit 22, will be referred to input source-language sentences.

The translation-subject-data DB 27 stores the input source-language sentences and stores machine-translatability classification flags for the individual sentences. The control unit 21 updates the classification flags in accordance with machine-translatability classification processing, which will be described later. Note that the classification flags are an example, and the data stored in the translation-subject-data DB 27 may be any data that enables discrimination as to whether each of the input source-language sentences is machine-translatable (machine-translatability).

The error DB 25 stores one or more source-language sentences for which machine translation from the source-language sentences into target-language sentences is not performed correctly. A source-language sentence for which machine translation from the source-language sentence into a target-language sentence is not performed correctly refer to a source-language sentence with which a target-language sentence resulting from actual machine translation by the machine translation server 6 has a meaning different from the meaning of the source-language sentence or is unclear in meaning when judged by a human. Preferably, the error DB 25 stores one or more combinations of words included in one or more source-language sentences for which machine translation from the source-language sentences into target-language sentences is not performed correctly, obtained by using a portion or the entirety of the stored source-language sentences. In this description, a combination of words is constituted of a plurality of words. For example, a combination of words is a phrase or idiom consisting of a plurality of words, or a simple word sequence. Here, the combinations of words stored in the error DB 25 are those for which machine translation is not performed correctly in the case where any of the constituent words is included.

In another example, the error DB 25 stores one or more single words included in one or more source-language sentences for which machine translation from the source-language sentences into target-language sentences is not performed correctly. In another example, the error DB 25 stores one or more source-language sentences for which machine translation from the source-language sentences into target-language sentences is not performed correctly, as well as one or more words or combination of words included in those source-language sentences.

The controlled-source-language-sentence DB 26 stores a plurality of source-language sentences as well as controlled source-language sentences, which are controlled source-language sentences corresponding to the plurality of source-language sentences and expressed in a format satisfying predetermined conditions. Preferably, the controlled-source-language-sentence DB 26 is a corpus storing, for each language (source language), a plurality of source-language sentences as well as a plurality of controlled source-language sentences corresponding to the source-language sentences. A controlled source-language sentence is a source-language sentence expressed by using a grammar, a syntax, and a vocabulary that are suitable for machine translation. In one example, a controlled source language is a natural language having a controlled grammar and vocabulary such that predetermined requirements are satisfied, which is generally called a controlled natural language (CNL). Hereinafter, it is assumed that the controlled source language is a CNL in this embodiment. Preferably, the controlled-source-language-sentence DB 26 stores the results of manually rewriting input source-language sentences into CNL sentences in advance as pairs.

The source-language-sentence DB includes a source-language-sentence corpus storing a plurality of source-language sentences. Each of the stored source-language sentences is associated with a score representing the complexity of that source-language sentence. The score is calculated by using a known method (e.g., William H. DuBay, The Principles of Readability, 25 Aug. 2004, http://www.impact-information.com/impactinfo/readability02.pdf), for example, by using the length of the source-language sentence, a word or a combination of words included in the source-language sentence, and the number of relative pronouns.

In another example, the score is calculated on the basis of at least one of the number of words of a predetermined part of speech included in the source-language sentence, such as relative pronouns or conjunctions, and the number of predetermined easily mistranslated words included in the source-language sentence. In another example, the score is calculated on the basis of at least one of the omission of a subject, a predicate, and an objective in the source-language sentence and whether or not the source-language sentence has a basic sentence structure.

The control unit 21 includes a basic control unit 31, a machine-translatability classification unit 32, a controlled-source-language-sentence conversion unit 36, a DB control unit 37, a machine-translation conversion unit 38, a machine-translation-server monitoring unit 39, and a machine learning unit 40.

The basic control unit 31 executes basic control of the entire translation support device 10. For example, the basic control unit 31 is a software module, such as an OS or middleware, for realizing various basic functions. The DB control unit 37 accepts instructions from individual parts and refers to or saves information in the various DBs 24 to 27. Although processing in which the individual parts directly perform DB operations will also be described below, it is to be understood that the processing is preferably performed via the DB control unit 37.

The machine-translatability classification unit 32 includes a syntactic filtering unit 33, a semantic filtering unit 34, and a controlled-source-language-sentence convertibility classification unit 35 and classifies whether or not the input source-language sentences are machine-translatable source-language sentences. This makes it possible to extract source-language sentences that cannot be subjected to machine translation. Similarly, this also makes it possible to extract source-language sentences that can be subjected to machine translation.

The syntactic filtering unit 33 determines, for each of the input source-language sentences, a score representing the complexity of that source-language sentence on the basis of the sentence structure of the input source-language sentence, and individually classifies whether or not each of the input source-language sentences is machine-translatable on the basis of the level of the score. The score representing the complexity of a source-language sentence is a quantitative score calculated by using the length of the source-language sentence, a word or a combination of words included, the number of relative pronouns, etc. In one example, at this time, the DB control unit 37 updates (stores) a machine-translatability classification flag for each of the input source-language sentences.

The syntactic filtering unit 33 extracts source-language sentences having high similarity with the input source-language sentences by using the source-language-sentence corpus. In one example, for two sentences that are compared with each other, similarity is determined by comparing the sentence lengths, the numbers of relative pronouns, the number of conjunctions, and the numbers of predetermined words (words specified in advance). The syntactic filtering unit 33 classifies whether the input source-language sentences are machine-translatable on the basis of the levels of the scores with which the extracted source-language sentences are associated. A machine-translatable source-language sentence (source-language sentence that is machine-translatable) refers to a source-language sentence from which a target-language sentence corresponding to the meaning of the source-language sentence, i.e., a suitably translated target-language sentence, is obtained when the source-language sentence is subjected to machine translation by the machine translation server 6. Meanwhile, a non-machine-translatable source-language sentence means the same as a source-language sentence for which machine translation is not performed correctly, and refers to a source-language sentence from which a target-language sentence having a meaning different from the meaning of the source-language sentence or a target-language sentence whose meaning is unclear is obtained when the source-language sentence is subjected to machine translation by the machine translation server 6.

Generally, machine translation tends not to be performed correctly as the sentence structure of the source-language sentence subjected to machine translation becomes more complex. The syntactic filtering unit 33 presets a threshold for scores with which machine translation is not performed correctly, and classifies whether or not the input source-language sentence is machine-translatable by comparing the score with which the extracted source-language sentence is associated with the score threshold. The threshold is set on the basis of the scores of source-language sentences for which machine translation is performed correctly and the scores of source-language sentences for which machine translation is not performed correctly.

In one example, in the case where the source-language sentence becomes more complex as the score becomes higher, the abovementioned threshold is set by using the minimum value of the scores of a plurality of source-language sentences for which machine translation is not performed correctly. In another example, the abovementioned threshold is set by using the average and standard deviation of the scores of a plurality of source-language sentences for which machine translation is performed correctly as well as the average and standard deviation of the scores of a plurality of source-language sentences for which machine translation is not performed correctly.

Here, suppose that the score representing the complexity of the source-language sentence is represented by a real value in the range of 0 to 1 and that the source-language sentence becomes more complex as the value becomes greater. In this case, when the threshold is set to be 0.8, for example, the syntactic filtering unit 33 classifies source-language sentences with scores less than 0.8 as being machine-translatable and classifies source-language sentences with scores greater than or equal to 0.8 as being non-machine translatable.

With this configuration, in this embodiment, the syntactic filtering unit 33 quantitatively determines the complexity of the input source-language sentence as a score and classifies whether or not the input source-language sentence is machine-translatable on the basis of the level of the determined score. This makes it possible to classify machine translatability on the basis of the complexity of the sentence structure of an input source-language sentence.

In another example, the syntactic filtering unit 33 calculates the score representing the complexity of the source-language sentence by using the known method mentioned earlier, and classifies whether or not the input source-language sentence is machine-translatable on the basis of the level of the score. For example, when calculating or determining the score, the syntactic filtering unit 33 calculates the score on the basis of the length of the source-language sentence, a word or a combination of words included in the source-language sentence, and the number of relative pronouns. In this case, since the syntactic filtering unit 33 can calculate or determine the score without having to use the source-language-sentence corpus, the translation support device 10 need not include the source-language-sentence DB 24.

For each of the input source-language sentences, the semantic filtering unit 34 individually classifies whether or not each of the input source-language sentences is machine-translatable on the basis of a word or a combination of words included in that input source-language sentence and words or combinations of words stored in the error DB 25. Preferably, the semantic filtering unit 34 performs this classification for the source-language sentences classified by the syntactic filtering unit 33 as being machine-translatable. In one example, at this time, the DB control unit 37 updates the machine-translatability classification flag for each of the input source-language sentences.

The input unit 22 can accept input indicating that a target-language sentence subjected to machine translation has not been suitably translated. Upon accepting this input, the DB control unit 37 stores the input source-language sentence corresponding to the target-language sentence for which the input has been received in the error DB 25. The machine learning unit 40 applies a machine learning algorithm to a portion or the entirety of the source-language sentences stored in the error DB 25 to learn feature quantities that are common to the group of non-machine-translatable sentences. For example, the machine learning unit 40 applies the machine learning algorithm to a portion or the entirety of the source-language sentences stored in the error DB 25, extracts combinations of words included in one or more source-language sentences for which machine translation is not performed correctly and stores the combinations of words in the error DB 25. The machine learning unit 40 may use a known machine learning algorithm, such as the random forest method or a method based on a neural network.

With this configuration, in this embodiment, the semantic filtering unit 34 classifies whether or not the input source-language sentence is machine-translatable by using the error DB 25 that has received feedback as to the evaluation of the qualities of target-language sentences actually obtained by machine translation. This makes it possible to determine machine translatability on the basis of the semantic complexity of the input source-language sentence.

In one example, the semantic filtering unit 34 classifies the input source-language sentence as being non-machine-translatable in the case where the input source-language sentence includes a predetermined amount of one of the combination of words stored in the error DB 25 and classifies the input source-language sentence as being machine-translatable in the case where the input source-language sentence does not include the predetermined amount.

In one example implementation, the semantic filtering unit 34 is a module that computes the semantic complexity of the original sentence by using the error DB 25. The source-language sentences stored in the error DB 25 can be expressed as bag-of-words (BoW) vectors. Specifically, a sentence s can be defined as follows.

$$S := <W_1, W_2, \ldots, W_n> \quad \text{(Formula 1)}$$

Here, $W_i$ signifies the number of occurrences of a word i in the sentence s, and the error DB 25 is a set S of such sentence vectors s.

$$s \in S. \quad \text{(Formula 2)}$$

Next, an example of computation of correlation using the sentence vector s will be described. When the sentence for which the semantic filtering unit 34 performs classification is signified by q, a binary classifier classifier(q) generated by using the machine learning unit 40 can be defined as follows:

$$\text{classifier}(q) \rightarrow \text{true}|\text{false}, \quad \text{(Formula 3)}$$

Here, true indicates that the sentence vector q has been classified as being machine-translatable, and false indicates that the sentence vector q has been classified as being non-machine-translatable.

In one example, the output unit 23 displays or outputs the input source-language sentences classified as being non-machine-translatable on the display or to the printer in accordance with an input to the input unit 22, accepted in response to a user operation.

The controlled-source-language-sentence convertibility classification unit 35 classifies whether or not the input source-language sentence classified by the semantic filtering unit 34 as being non-machine translatable is convertible into a controlled source-language sentence (CNL sentence) on the basis of the controlled-source-language-sentence DB 26. Here, convertible means being convertible by using the controlled-source-language-sentence DB 26 without requiring manual intervention. Preferably, the controlled-source-language-sentence convertibility classification unit 35 compares a word or a combination of words included in the input source-language sentence with the words or combinations of words included in the source-language sentences stored in the controlled-source-language-sentence DB 26 (corpus). In this manner, the degree of matching between two sentences is calculated, and convertibility into a controlled source-language sentence is classified on the basis of the level of the degree of matching.

As described earlier, multi-language translation via a CNL has already been introduced into practical use as a method of automatically translating accurate information, as in multi-language rendering of avalanche warnings. As will be understood from this fact, conversion of an input source-language sentence into a CNL sentence is conversion into a source-language sentence having low ambiguity. That is, even an input source-language sentence classified as being non-machine-translatable can be rendered into a machine-translatable source-language sentence through conversion into a controlled source-language sentence. Therefore, the controlled-source-language-sentence convertibility classification unit 35 classifies input source-language sentences classified as being convertible into controlled source-language sentences as being machine-translatable, and classifies input source-language sentences classified as being non-convertible into controlled source-language sentences as being non-machine-translatable.

In one example, the translation-subject-data DB 27 stores a controlled-source-language-sentence convertibility classification flag for each of the input source-language sentences. The DB control unit 37 updates (stores) this flag for each of the input source-language sentences.

The controlled-source-language-sentence conversion unit 36 converts each of the input source-language sentences classified as being convertible into controlled source-language sentences into a controlled source-language sentence by using the controlled-source-language-sentence DB 26.

Preferably, the controlled-source-language-sentence conversion unit 36 includes the controlled-source-language-sentence convertibility classification unit 35, classifies whether input source-language sentences are convertible into controlled source-language sentences, and converts each of the input source-language sentences classified as being convertible into a controlled source-language sentence.

Preferably, the DB control unit 37 extracts, among the input source-language sentences, input source-language sentences classified as being non-machine-translatable (non-convertible into controlled source-language sentences) in accordance with an input to the input unit 22 accepted in response to a user operation. The output unit 23 can display or output the extracted input source-language sentences on the display or to the printer. Alternatively, the DB control unit 37 may extract, from among the input source-language sentences, input source-language sentences classified as being machine-translatable in response to an input to the input unit 22 accepted in response to a user operation.

The input unit 22 can accept the input of a controlled source-language sentence in relation to an input source-language sentence classified as being non-convertible into a controlled source-language sentence. Upon accepting this input, the controlled-source-language-sentence conversion unit 36 converts the input source-language sentence corresponding to the input into the controlled source-language sentence accepted as the input. The DB control unit 37 stores the controlled source-language sentence accepted as the input and the corresponding input source-language sentence in the controlled-source-language-sentence DB 26. In one example, the controlled-source-language-sentence convertibility classification unit 35 classifies the input source-language sentence corresponding to the input as being machine-translatable and thus classifies the input source-language sentence as being convertible into a controlled source-language sentence.

According to what has been described above, source-language sentences to be subjected to machine translation are input source-language sentences classified as being machine-translatable and not subjected to the controlled-source-language-sentence convertibility classification as well as input source-language sentences converted into controlled source-language sentences.

In accordance with an input to the input unit 22 accepted in response to a user operation, the machine-translation conversion unit 38 sends the source-language sentences to be subjected to machine translation to the machine translation server 6 via the communication device 15 and receives target-language sentences obtained by machine translation from the machine translation server 6. The machine-translation conversion unit 38 stores the target-language sentences obtained by machine translation in the translation-subject-data DB 27. The output unit 23 displays or outputs the target-language sentences obtained by machine translation on the display or to the printer in accordance with an input to the input unit 22 accepted in response to a user operation. Preferably, at this time, the output unit 23 displays or outputs the target-language sentences together with the corresponding pre-translation input source-language sentences. Alternatively, the machine-translation conversion unit 38 may execute machine translation only with a portion of the source-language sentences to be subjected to machine translation in response to an input to the input unit 22 accepted in response to a user operation.

Preferably, the machine-translation conversion unit 38 includes a character-sequence-conversion filtering unit. The character-sequence-conversion filtering unit substitutes pre-set proper nouns for predetermined words included in the source-language sentences to be subjected to machine translation before the source-language sentences are sent to the machine translation server 6. Then, upon receiving target-language sentences obtained by machine translation from the machine translation server 6, the character-sequence-conversion filtering unit resubstitutes the pre-substitution predetermined words for the proper nouns substituted in advance and included in the target-language sentences. Alternatively, upon receiving target-language sentences obtained by machine translation from the machine translation server 6, the character-sequence-conversion filtering unit may resubstitute target-language words corresponding to the pre-substitution predetermined words for the target-language words corresponding to the proper nouns substituted in advance and included in the target-language sentences.

The machine translation server 6, which is a generic product, does not have a dictionary including proper nouns in the game, such as the names of characters or the names of imaginary places. Furthermore, machine translation by the machine translation server 6 has the properties that the translation accuracy is considerably compromised when unknown words appear. Therefore, it becomes possible to prevent the deterioration of the accuracy of machine translation by the character-sequence-conversion filtering unit substituting generic terms for unknown words and resubstituting the unknown words after machine translation.

FIG. 4 shows the manner of the filtering processing by the character-sequence-conversion filtering unit of the machine-translation conversion unit 38 according to the embodiment of the present invention, showing an example of a screen that is output to the display by the output unit 23. In this example, the source language is English, and the target language is Japanese. As shown in a box 41, "Oneiros met Coux" is input as a source-language sentence to be subjected to machine translation. As described earlier, this source-language sentence includes proper nouns "Coux" and "Onerios", but these are not registered in the dictionary of the existing machine translation system and thus cannot be translated.

As shown in a box 42, the character-sequence-conversion filtering unit individually substitutes common proper nouns, specifically, Andy for Coux and Bob for Onerios, before the source-language sentence to be subjected to machine translation is sent to the machine translation server 6. Upon receiving a target-language sentence obtained by machine translation, shown in a box 43, from the machine translation server 6, the character-sequence-conversion filtering unit individually resubstitutes Coux for Andy and Onerios for Bob, as shown in a box 44. The machine-translation conversion unit 38 stores the target-language sentence obtained by machine translation and subjected to resubstitution in the translation-subject-data DB 27. Note that although the boxes 42 and 43 are shown for the convenience of explanation, preferably, the boxes 42 and 43 are not usually displayed.

The translation support device 10 stores substitution candidate lists in the storage device 14. In one example, the substitution candidate lists are lists that associate, in advance, proper nouns such as Andy, Bob, Charles, . . . with male names and proper nouns such as Anna, Becky, Carol, . . . with female names that are predicted to be input as source-language sentences. In one example, the substitution candidate lists include lists corresponding to categories of proper nouns, such as names of persons, names of weapons, and names of tricks, and the character-sequence-conversion filtering unit performs substitution processing with reference to the substitution candidate lists in accordance with the categories. In one example, in the case of a language in which personalities are expressed with variations at the ends of sentences, such as Japanese, the substitution candidate lists include a list for converting, for example, " . . . desu"into" . . . daze", and the character-sequence-conversion filtering unit performs substitution processing with reference to the substitution candidate lists in accordance with the categories. In one example, the substitution candidate lists are configured such that nouns in the target language, such as Andii, Bobu, Chaaruzu, . . . , correspond to proper nouns such as Andy, Bob, Charles, . . . so that the character-sequence-conversion filtering unit can perform resubstitution suitably when the proper nouns are subjected to machine translation.

The machine-translation-server monitoring unit 39 regularly (e.g., once a month, once in three months, or once in half a year) sends preset source-language sentences to the machine translation server 6 and receives target-language sentences obtained by machine translation from the machine translation server 6. The machine-translation-server monitoring unit 39 compares the target-language sentences obtained by machine translation this time with the target-language sentences obtained by machine translation the previous time (e.g., one month before in the case where machine translation is performed once a month) and detects changes or updates of the machine translation server 6 from the resulting differences. Preferably, the preset source-language sentences are a plurality of machine-translatable source-language sentences.

Figure 5:
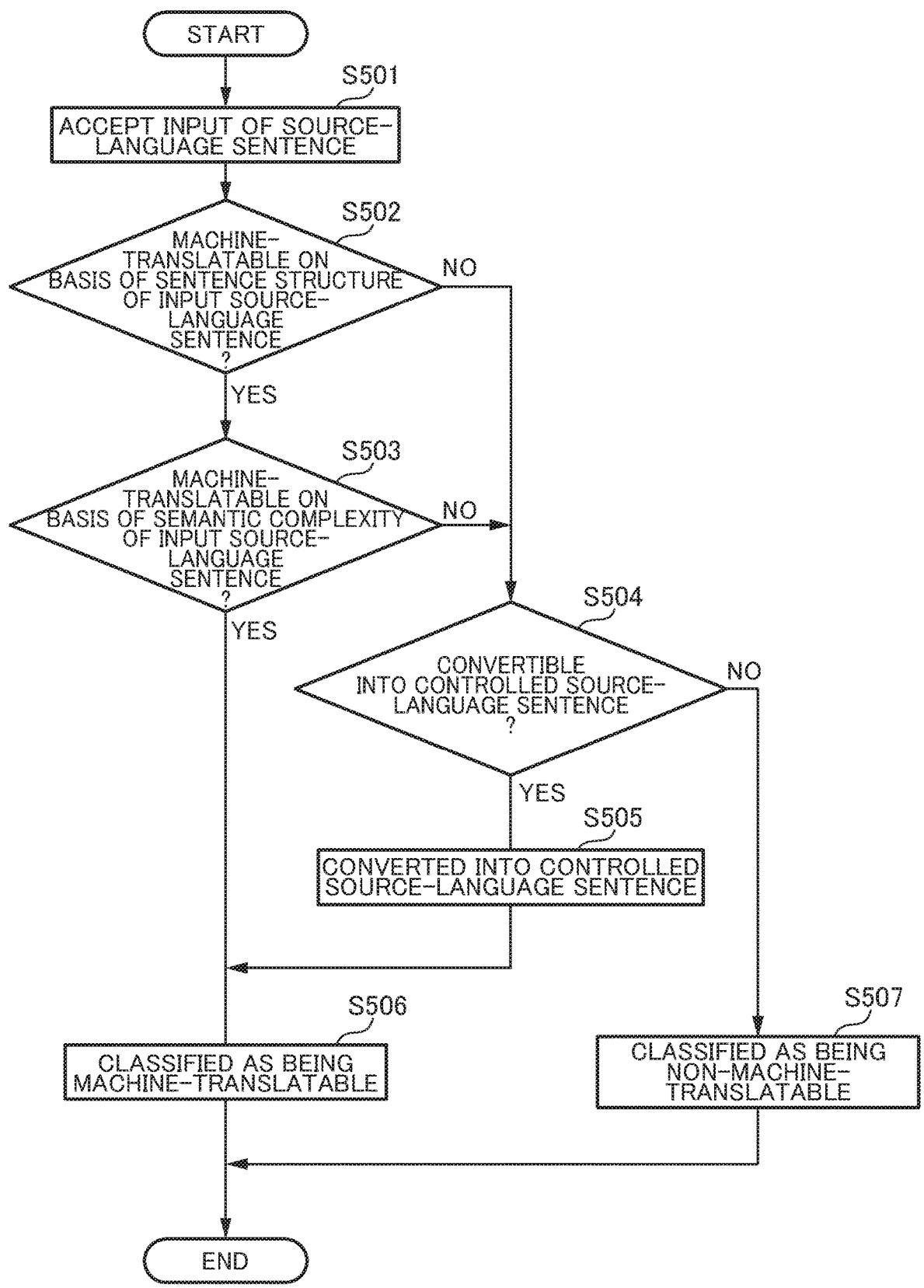
FIG. 5 is a flowchart showing processing for machine-translatability classification by the translation support device according to the embodiment of the present invention.

Next, the processing for the machine-translatability classification by the translation support device 10 according to the embodiment of the present invention will be described with reference to the flowchart shown in FIG. 5. For simplicity of explanation, here, processing for a single input source-language sentence will be explained. First, in step 501, the input unit 22 accepts the input of an input source-language sentence.

Then, in step 502, for the input source-language sentence, the syntactic filtering unit 33 determines a score representing the complexity of the input source-language sentence on the basis of the sentence structure of the input source-language sentence, and classifies whether or not the input source-language sentence is machine-translatable on the basis of the level of the score. The processing proceeds to step 503 in the case where the input source-language sentence is classified as being machine-translatable, and the processing proceeds to step 504 in the case where the input source-language sentence is classified as being non-machine-translatable.

In step 503, for the input source-language sentence, the semantic filtering unit 34 classifies whether or not the input source-language sentence is machine-translatable on the basis of a word or a combination of words included in the input source-language sentence and the words or combinations of words stored in the error DB 25. The processing proceeds to step 506 in the case where the input source-language sentence is classified as being machine-translatable, and the machine-translatability classification unit 32 classifies the input source-language sentence as being machine-translatable. In the case where the input source-language sentence is classified as being non-machine-translatable, the processing proceeds to step 504.

In step 504, the controlled-source-language-sentence convertibility classification unit 35 classifies whether or not the input source-language sentence is convertible into a CNL sentence on the basis of the controlled-source-language-sentence DB 26. In the case where the input source-language sentence is convertible into a CNL sentence, in step 505, the controlled-source-language-sentence conversion unit 36 converts the input source-language sentence into a CNL sentence by using the controlled-source-language-sentence DB 26. Then, in step 506, the machine-translatability classification unit 32 classifies the input source-language sentence as being machine-translatable. In the case where the input source-language sentence is not convertible into a CNL sentence, in step 507, the machine-translatability classification unit 32 classifies the input source-language sentence as being non-machine-translatable.

The processing for machine-translatability classification is executed in this manner, and the results of processing are stored in the translation-subject-data DB 27. The DB control unit 37 (translation support device 10) can extract at least either input source-language sentences classified as being non-machine-translatable or input source-language sentences classified as being machine-translatable from the plurality of input source-language sentences.

Next, machine-translation processing executed by the translation support device 10 according to the embodiment of the present invention will be described with reference to the flowchart shown in FIG. 6. First, in step 601, the input unit 22 receives the input of source-language sentences to be subjected to machine translation.

Then, in step 602, the character-sequence-conversion filtering unit of the machine-translation conversion unit 38 substitutes preset proper nouns for predetermined words included in the source-language sentences to be subjected to machine translation.

Then, in step 603, the machine-translation conversion unit 38 sends the source-language sentences to be subjected to machine translation, having been subjected to substitution processing in step 602, to the machine translation server 6, whereby machine translation is executed, and receives target-language sentences obtained by machine translation from the machine translation server 6.

Then, in step 604, upon receiving the target-language sentences obtained by machine translation from the machine translation server 6, the machine-translation conversion unit 38 resubstitutes the predetermined words included before the substitution for the substituted preset proper nouns included in the target-language sentences.

Next, the operation and advantages of the translation support system 1 (translation support device 10) according to the embodiment of the present invention will be described. In this embodiment, the translation support system 1 classifies whether or not input source-language sentences to be translated are machine-translatable from the viewpoints of the sentence structure and semantic complexity by using the syntactic filtering unit 33 and the semantic filtering unit 34 to automatically extract text to be manually modified in order to apply machine translation. This makes it possible to realize low-cost translation (translation support) in which, by using a machine-translation system, original text, i.e., input source-language sentences, are utilized as much as possible to reduce manual text modification. Furthermore, by using the machine translation server 6, which is an existing machine translation system, it becomes possible to realize translation (translation support) involving many languages supported by the existing machine translation system.

Furthermore, in this embodiment, the translation support system 1 classifies whether or not the input source-language sentences classified by the semantic filtering unit 34 as being non-machine-translatable are convertible into CNL sentences on the basis of the controlled-source-language-sentence DB 26, thereby classifying whether the input source-language sentences are machine-translatable according to that convertibility. The translation support system 1 converts each of the input source-language sentences classified as being convertible into CNL sentences into a CNL sentence and classifies the input source-language sentence as being machine-translatable. As described above, through rewriting into text having low ambiguity, the translation support system 1 can even render input source-language sentences classified as being non-machine-translatable into machine-translatable source-language sentences by converting those input source-language sentences into CNL sentences. This makes it possible to realize low-cost translation (translation support) in which high translation accuracy is maintained while reducing manual text modification by utilizing as much original text as possible.

Furthermore, in this embodiment, the translation support system 1 can accept an input indicating that a target-language sentence obtained by machine translation was not a suitable translation, and the error DB 25 stores the input source-language sentence corresponding to the target-language sentence for which the input has been received. The translation support system 1 uses, in the semantic filtering unit 34, the error DB 25 that has received feedback as to the evaluations of the qualities of target-language sentences actually obtained by machine translation, as described above. Furthermore, in this embodiment, the controlled-source-language-sentence DB 26 stores the results of rewriting input source-language sentences into CNL sentences in the form of pairs. The translation support system 1 converts input source-language sentences into CNL sentences on the basis of the controlled-source-language-sentence DB 26. Here, as an example, multi-language rendering of text in a game (text such as the scenario, etc. in the game) in which a large volume of text is displayed, such as Japanese RPGs, will be considered. With the configuration described above, the translation support system 1 can improve the accuracy of classification by the semantic filtering unit 34 and the accuracy of conversion into CNL by accumulating DB data relating to the text of a subject game in the controlled-source-language-sentence DB 26 and the error DB 25. This makes it possible to maintain high translation accuracy while reducing manual interventions. Furthermore, for example, by using the translation support system 1, it becomes possible to perform translation of content relating to the subject game and including a few megabytes of text into a plurality of languages at the costs of rewriting about 30% to 50% of the entire text just once. Note that the translation support system 1 is also applicable to pattern-based sentences in FAQs, helps, websites, and chat bots as well as games.

Furthermore, after executing the processing for classifying whether or not the source-language sentences to be subjected to machine translation are machine-translatable, the translation support system 1 uses the machine translation server 6, which is an existing machine translation system, as a black box in relation to the source-language sentences. As described above, in this embodiment, the translation support system 1 does not depend on any specific machine translation system. Thus, the machine translation server 6 may be an arbitrary machine translation system, such as Google Translate API or Microsoft Translate API, and migration at extremely low cost is possible when a more advanced machine translation system appears in the future.

Furthermore, the translation support system 1 substitutes preset proper nouns for predetermined words included in source-language sentences to be subjected to machine translation before sending the source-language sentences to be subjected to machine translation to the machine translation server 6. Then, upon receiving target-language sentences obtained by machine translation from the machine translation server 6, the translation support system 1 resubstitutes the predetermined words included before the substitution for the proper nouns substituted in advance and included in the target-language sentences. For example, in the case where the text in a game is to be translated, it is conceivable that unknown words appear more often compared with ordinary text. With the configuration described above, the translation support system 1 makes it possible to prevent deterioration of the accuracy of machine translation by the machine translation server 6 due to the occurrence of unknown words.

Furthermore, in this embodiment, the machine-translation-server monitoring unit 39 regularly subjects preset source-language sentences to machine translation by using the machine translation server 6, for example, once a month, and detects changes or updates of the machine translation server 6 from the differences in target-language sentences that are obtained regularly. With this configuration, the translation support device 10 regularly monitors translation results by a general-purpose machine translation system and recalculates machine translatability when a considerable change occurs in the translation results, which makes it possible to automatically follow updates of the machine translation system.

FIG. 7 is an overall configuration diagram of a translation system 2 according to another embodiment of the present invention. As shown in FIG. 7, the translation system 2 includes the translation support device 10, the machine translation server 6, and an end-user terminal 8. The translation support device 10, the machine translation server 6, and the end-user terminal 8 are connected to the network 4, such as the Internet, such that mutual communications are allowed thereamong. Note that the configuration is the same as that of the translation support system 1 except that the translation support system 1 (translation system 2) includes the user terminal 8. Therefore, the description will be directed mainly to differences.

For example, in the case where the content subjected to machine translation is a game, the end-user terminal 8 is a terminal of a user such as an end user who plays the game or a debugging worker. The end-user terminal 8 is a computer used by a user who browses text obtained by machine translation, and may be, for example, a personal computer, a tablet terminal, a smartphone, a mobile phone, or the like. Since the hardware configuration of the end-user terminal 8 is known, a description thereof will be omitted.

The end-user terminal 8 is configured such that, in the case where an end user could not understand the meaning of text (target-language sentence) obtained by machine translation when browsing the text, an input indicating the failure to understand can be accepted. For example, the end-user terminal 8 displays a button such as "report translation problem" on the display thereof and accepts the input when this button is clicked on by the end user. Upon accepting the input, the end-user terminal 8 sends translation feedback data with which the text whose meaning was not understood is associated to the translation support device 10.

When the translation feedback data from the end-user terminal 8 is received by the input unit 22, the DB control unit 37 stores the input source-language sentence corresponding to the target-language sentence associated with the received data in the error DB 25.

With this configuration, in this embodiment, it becomes possible to further improve the accuracy of classification by the semantic filtering unit 34.

In another embodiment, the translation support device 10 does not include at least one of the source-language-sentence DB 24, the error DB 25, the controlled-source-language-sentence DB 26, and the translation-subject-data DB 27. In this case, the translation support system 1 includes a database server having a DB function not included in the translation support device 10, and the translation support device 10 is configured so as to be allowed to access the database server.

Another embodiment may be a computer-readable storage medium storing a program for realizing the functions of one of the above-described embodiments of the present invention or information processing shown in the flowcharts. Yet another embodiment may be a server that is capable of providing the translation support device 10 with a program for realizing the functions of one of the above-described embodiments of the present invention or information processing shown in the flowcharts. The server allows the translation support device 10 to download the program via wired or wireless communications. Yet another embodiment may be a virtual machine that realizes the functions of one of the above-described embodiments of the present invention or information processing shown in the flowcharts.

In the processing or operation described above, the processing and operation may be modified freely unless no consistency arises in the processing or operation, such as an inconsistency that a step involves the use of data that could not yet be available in that step. Furthermore, the embodiments described above are examples for explaining the present invention, and the present invention is not limited to these embodiments. The present invention may be embodied in various forms not departing from the gist thereof.

REFERENCE SIGNS LIST

1 Translation support system
2 Translation system
4 Network
6 Machine translation server
8 User terminal
10 Translation support device
11 Processor
12 Input device
13 Output device
14 Storage device
15 Communication device
21 Control unit
22 Input unit
23 Output unit
24 Source-language-sentence database (source-language-sentence DB)
25 Error database (error DB)
26 Controlled-source-language-sentence DB (controlled-source-language-sentence DB)
27 Translation-subject-data database (translation-subject-data DB)
31 Basic control unit
32 Machine-translatability classification unit
33 Syntactic filtering unit
34 Semantic filtering unit
35 Controlled-source-language-sentence convertibility classification unit
36 Controlled-source-language-sentence conversion unit
37 Database control unit (DB control unit)
38 Machine-translation conversion unit
39 Machine-translation-server monitoring unit
40 Machine learning unit
41 to 44 Box

The invention claimed is:

1. A translation support system for supporting machine translation from a source-language sentence into a target-language sentence, the translation support system comprising:

a user interface that accepts an input of a source-language sentence to be translated;

an error database that at least stores words or combinations of words included in a plurality of source-language sentences for which machine translation from the source-language sentences into target-language sentences is not performed correctly;

a controlled-source-language-sentence corpus that stores a plurality of source-language sentences as well as controlled source-language sentences, which are source-language sentences that are controlled, corresponding to the plurality of source-language sentences and expressed in a format satisfying predetermined conditions;

a control unit comprising a processor and memory, wherein the memory comprises instructions that are configured to classify whether or not the input source-language sentence is machine-translatable; and a display that is capable of outputting the input source-language sentence classified as being non-machine-translatable, wherein the memory in the control unit further comprises instructions configured to:

determine a score representing the complexity of the input source-language sentence on the basis of the sentence structure of the input source-language sentence, classifies whether or not the input source-language sentence is machine-translatable according to the level of the score, and in the case where the input source-language sentence is classified as being machine-translatable, further classifies whether or not the input source-language sentence is machine-translatable on the basis of a word or a combination of words included in the input source-language sentence as well as the words or combinations of words stored in the error database; and in the case where the input source-language sentence is classified as being non-machine-translatable, classify whether or not the input source-language sentence is convertible into the controlled-source-language sentence on the basis of the degrees of matching between the word or the combination of words included in the input source-language sentence and the words or the combination of words included in the source-language sentences stored in the controlled-source-language-sentence corpus, and in the case where the input source-language sentence is classified as being convertible, convert the input source-language sentence into the controlled-source-language sentence by using the controlled-source-language-sentence corpus and classify the input source-language sentence as being machine-translatable, and in the case where the input source-language sentence is classified as being non-convertible, classify the input source-language sentence as being non-machine-translatable.

2. A translation support system according to claim 1, wherein the memory in the control unit further comprises instructions configured to determine the score representing the complexity of the input source-language sentence on the basis of at least one of the length of the source-language sentence, the number of predetermined parts of speech included in the source-language sentence, and the number of predetermined words included in the source-language sentence.

3. A translation support system according to claim 1,
wherein the translation support system further comprises a source-language-sentence corpus that stores a plurality of source-language sentences, each of the stored source-language sentences being associated with a score representing the complexity of that source-language sentence, and
wherein the memory in the control unit further comprises instructions configured to determine the score representing the complexity of the input source-language sentence on the basis of the score associated with one of the stored source-language sentences, having high similarity with the input source-language sentence.

4. A translation support system according to claim 1, wherein the controlled-source-language sentence is a source-language sentence expressed by using a grammar, a syntax, and a vocabulary that are suitable for machine translation.

5. A translation support system according to claim 1,
wherein the user interface is further configured to accept an input of a controlled source-language sentence for the source-language sentence classified as being non-convertible into a controlled source-language sentence, and
wherein the memory in the control unit further comprises instructions configured to convert the source-language sentence classified as being non-convertible into a controlled source-language sentence into the controlled source-language sentence accepted as the input, and stores the source-language sentence classified as being non-convertible into a controlled source-language sentence and the controlled source-language sentence accepted as the input in the controlled-source-language-sentence corpus.

6. A translation support system according to claim 1, wherein the processor in the control unit, by using a machine translation system, executes machine translation for the input source-language sentence classified as being machine-translatable and the converted controlled-source-language sentence and outputs target-language sentences obtained by the machine translation to the display.

7. A translation support system according to claim 6,
wherein the user interface is configured to further accept that the target-language sentence obtained by the machine translation was not a suitable translation, and
wherein the processor in the control unit stores the input source-language sentence before the execution of the machine translation, corresponding to the target-language sentence, in the error database.

8. A translation support system according to claim 6, wherein the memory in the control unit comprises instructions that are configured to substitute another preset proper noun for one preset proper noun included in the input source-language sentence before the execution of the machine translation, and resubstitutes the one preset proper noun before the substitution for the substituted other preset proper noun included in the target-language sentence obtained by the machine translation.

9. A translation support system according to claim 6, wherein the processor in the control unit regularly executes machine translation for a preset source-language sentence by using the machine translation system and detects a change in the machine translation system on the basis of a comparison between a target-language sentence obtained by machine translation at a current time and a target-language sentence obtained by machine translation at an immediately preceding time.

10. A translation support device for supporting machine translation from a source-language sentence into a target-language sentence, the translation support device comprising:
a user interface that accepts an input of a source-language sentence to be translated;
an error database that at least stores words or combinations of words included in a plurality of source-language sentences for which machine translation from the source-language sentences into target-language sentences is not performed correctly;
a controlled-source-language-sentence corpus that stores a plurality of source-language sentences as well as controlled source-language sentences, which are source-language sentences that are controlled, corresponding to the plurality of source-language sentences and expressed in a format satisfying predetermined conditions;
a control unit comprises a processor and memory, wherein the memory comprises instructions that are configured to classify whether or not the input source-language sentence is machine-translatable; and
a display that is configured to output the input source-language sentence classified as being non-machine-translatable,
wherein the memory in the control unit further comprises instructions configured to:
determine a score representing the complexity of the input source-language sentence on the basis of the sentence structure of the input source-language sentence, classifies whether or not the input source-language sentence is machine-translatable according to the level of the score, and
in the case where the input source-language sentence is classified as being machine-translatable, further classify whether or not the input source-language sentence is machine-translatable on the basis of a word or a combination of words included in the input source-language sentence as well as the words or combinations of words stored in the error database; and
in the case where the input source-language sentence is classified as being non-machine-translatable, classify whether or not the input source-language sentence is convertible into the controlled-source-language sentence on the basis of the degrees of matching between the word or the combination of words included in the input source-language sentence and the words or the combination of words included in the source-language sentences stored in the controlled-source-language-sentence corpus, and
in the case where the input source-language sentence is classified as being convertible, convert the input source-language sentence into the controlled-source-language sentence by using the controlled-source-language-sentence corpus and classify the input source-language sentence as being machine-translatable, and in the case where the input source-language sentence is classified as being non-convertible, classify the input source-language sentence as being non-machine-translatable.

11. A non-transitory computer readable medium storing a program for supporting machine translation from a source-language sentence into a target-language sentence, the program causing a computer to execute:

an input accepting step of accepting an input of a source-language sentence to be translated;

a first classifying step of determining a score representing the complexity of the input source-language sentence on the basis of the sentence structure of the input source-language sentence and classifying whether or not the input source-language sentence is machine-translatable according to the level of the score;

a second classifying step of classifying, in the case where the input source-language sentence is classified as being machine-translatable in the first classifying step, whether or not the input source-language sentence is machine-translatable on the basis of a word or a combination of words included in the input source-language sentence as well as words or combinations of words stored in a database that at least includes words or combinations of words included in a plurality of source-language sentences for which machine translation from the source-language sentences into target-language sentences is not performed correctly;

a third classifying step of classifying, in the case where the input source-language sentence is classified as being non-machine-translatable in the first classifying step or the second classifying step, whether or not the input source-language sentence is convertible into the controlled-source-language sentence on the basis of the degrees of matching between the word or the combination of words included in the input source-language sentence and words or combinations of words included in source-language sentences stored in a corpus that stores a plurality of source-language sentences as well as controlled source-language sentences, which are source-language sentences that are controlled, corresponding to the plurality of source-language sentences and expressed in a format satisfying predetermined conditions, and in the case where the input source-language sentence is classified as being convertible, converting the input source-language sentence into the controlled-source-language sentence by using the corpus and classifying the input source-language sentence as being machine-translatable, and in the case where the input source-language sentence is classified as being non-convertible, classifying the input source-language sentence as being non-machine-translatable; and an output step of outputting the input source-language sentence classified as being non-machine-translatable in the third classifying step.

12. A method for supporting machine translation from a source-language sentence into a target-language sentence, the method being executed by a computer and comprising:

an input accepting step of accepting an input of a source-language sentence to be translated;

a first classifying step of determining a score representing the complexity of the input source-language sentence on the basis of the sentence structure of the input source-language sentence and classifying whether or not the input source-language sentence is machine-translatable according to the level of the score;

a second classifying step of classifying, in the case where the input source-language sentence is classified as being machine-translatable in the first classifying step, whether or not the input source-language sentence is machine-translatable on the basis of a word or a combination of words included in the input source-language sentence as well as words or combinations of words stored in a database that at least includes words or combinations of words included in a plurality of source-language sentences for which machine translation from the source-language sentences into target-language sentences is not performed correctly;

a third classifying step of classifying, in the case where the input source-language sentence is classified as being non-machine-translatable in the first classifying step or the second classifying step, whether or not the input source-language sentence is convertible into the controlled-source-language sentence on the basis of the degrees of matching between the word or the combination of words included in the input source-language sentence and words or combinations of words included in source-language sentences stored in a corpus that stores a plurality of source-language sentences as well as controlled source-language sentences, which are source-language sentences that are controlled, corresponding to the plurality of source-language sentences and expressed in a format satisfying predetermined conditions, and in the case where the input source-language sentence is classified as being convertible, converting the input source-language sentence into the controlled-source-language sentence by using the corpus and classifying the input source-language sentence as being machine-translatable, and in the case where the input source-language sentence is classified as being non-convertible, classifying the input source-language sentence as being non-machine-translatable; and an output step of outputting the input source-language sentence classified as being non-machine-translatable in the third classifying step.

* * * * *